Mar. 13, 1923.
W. A. McCOLLOUGH
WATER HEATER
Original Filed July 7, 1919
1,448,074
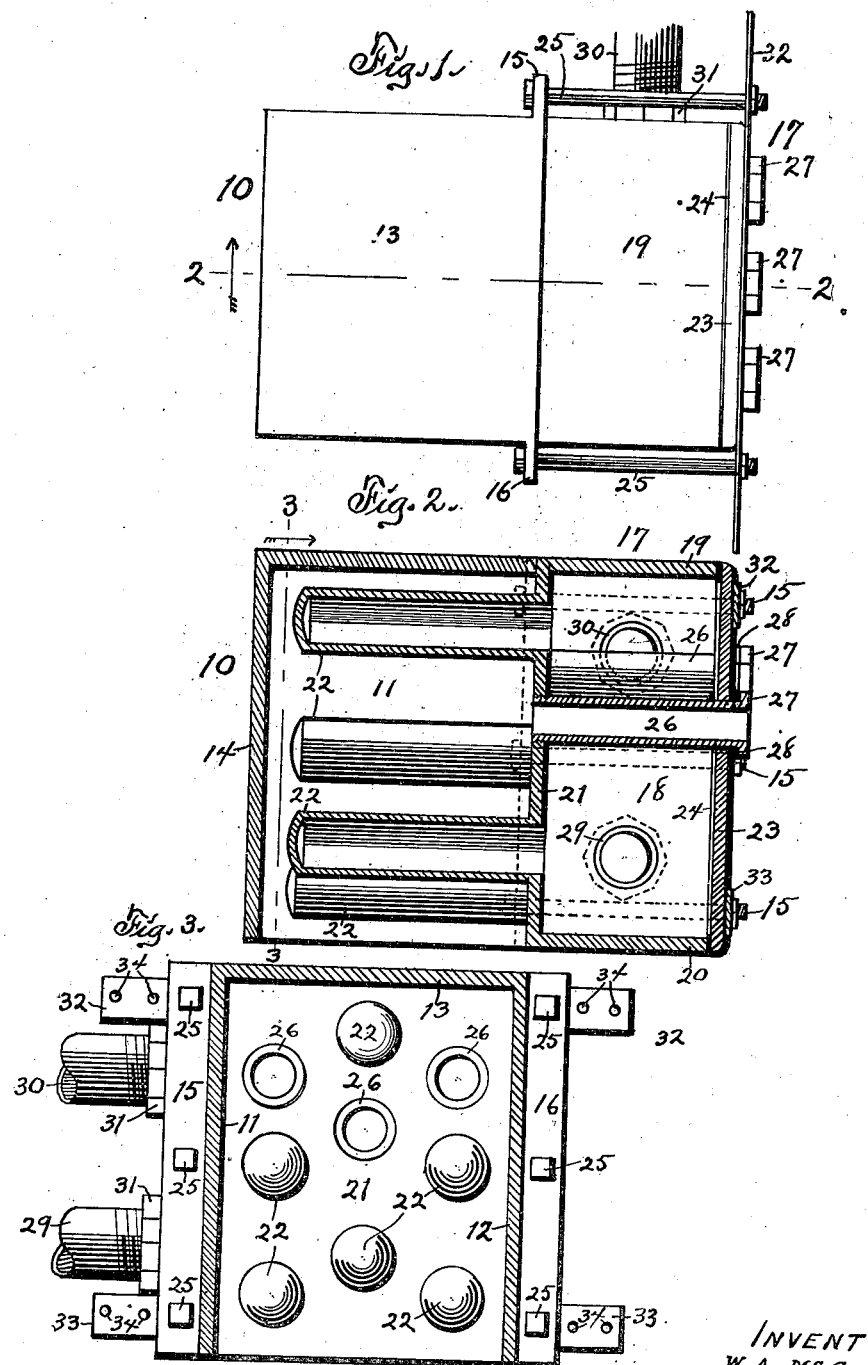
INVENTOR:
W. A. McCOLLOUGH
By Earl M. Sinclair
Atty.

Patented Mar. 13, 1923.

1,448,074

UNITED STATES PATENT OFFICE.

WILLIAM A. McCOLLOUGH, OF WEBSTER CITY, IOWA, ASSIGNOR TO W. A. McCOLLOUGH & SONS, INC., OF WEBSTER CITY, IOWA, A CORPORATION OF IOWA.

WATER HEATER.

Application filed July 7, 1919, Serial No. 309,089. Renewed May 22, 1922. Serial No. 562,844.

*To all whom it may concern:*

Be it known that I, WILLIAM A. McCOLLOUGH, a citizen of the United States of America, and resident of Webster City, Hamilton County, Iowa, have invented a new and useful Water Heater, of which the following is a specification.

The object of this invention is to provide improved means to be employed in heating water in and throughout a tank or other place of storage of water for use of stock or for domestic consumption.

A further object of this invention is to provide a device adapted for use auxiliary to and outside of a water tank and having water circulation with said tank, which device and the contents thereof are adapted to be artificially heated and in turn heat the contents of the water tank.

A further object of this invention is to provide a heater outside of and in water circulation with a tank, which heater combines an air chamber adapted to be heated, a water chamber having extensions into said air chamber and having circulating communication with a water tank or reservoir, there being tubes extending from the air chamber through the water chamber.

My invention consists in the construction, arrangement and combination of elements hereinafter set forth, pointed out in the claims and illustrated by the accompanying drawing, in which—

Figure 1 is a plan of the device. Figure 2 is a longitudinal section on the indicated line 2—2 of Figure 1. Figure 3 is a cross-section on the indicated line 3—3 of Figure 2.

In the construction of the device as shown the numeral 10 designates generally an air chamber having side walls 11, 12, a top wall 13 and an end wall 14 preferably formed of metal by molding and open at its bottom, the opposite end of said chamber being closed by a separate member as hereinafter described. Upright flanges 15, 16 are formed on end portions of the side walls 11, 12, and said flanges are formed with bolt holes. A water chamber, designated generally by the numeral 17, is formed with side walls 18, one of which is shown in Figure 2, a top wall 19, a bottom wall 20 and an end wall 21, preferably made of metal by molding and open at one end, said open end being closable by means hereinafter described. Extension water chambers, flues or tubes 22, in this instance six in number, are formed integral with and open through the end wall 21 of the main water chamber and are closed at their ends opposite to said wall. The extensions 22 preferably are formed integral with the main chamber by molding therewith and also preferably extend in parallel horizontal planes from the end wall 21. The end wall 21 is formed with a plurality of holes above the horizontal plane of the center thereof and said holes preferably are tapped. An end plate 23 is removably and replaceably mounted across the open end of the water chamber 17, and a gasket 24 is mounted between said end plate and ends of the walls 18, top 19 and bottom 20. Bolts 25 are mounted in the holes of the flanges and are arranged to clamp said end plate and the gasket to the walls, top and bottom of the water chamber 17 when the water chamber is mounted with its end wall 21 in contact with the side walls 11, 12 and top wall 13 of the air chamber. Thus is the water chamber 17 rigidly, yet detachably, secured to the air chamber 10 with the extension chambers 22 within and throughout the air chamber. Flues 26 are mounted through smooth holes in the end plate 23, extend across the water chamber 17 parallel with the bolts 25, and are screwed into the tapped holes in the end wall 21. The flues 26 are open at both ends and are formed with angular heads 27 integral with their outer ends to receive a wrench for seating and unseating them. Gaskets 28 are interposed between the heads 27 and adjacent faces of the end plate 23 to prevent leakage from the water chamber through the smooth holes in the end plate 23. The flues 26 supplement the bolts 25 in securing the end plate 23 to the water chamber 17. Tapped holes are formed in one of the walls 18, one above the other, and ingress and egress pipes 29, 30 are screwed in said holes and secured to said wall by jamb nuts 31 on said pipes. The pipes 29, 30 provide communication between the water chamber 17 and a water tank or reservoir (not shown). Straps or bars 32, 33 are mounted parallel with each other across the outer face of the end plate 23 and the bolts 25 preferably pass through said straps or bars to clamp said end plate to the water chamber. The straps or bars 32, 33 are provided with apertures 34 in projecting end portions adapted to receive fastening means, such as bolts (not shown) whereby they may be secured detachably to a support. The support for the entire device, auxiliary to the pipes 29, 30, may be a cabinet or housing of suitable form to which the device is secured by the straps or bars 32, 33. A heater or lamp of suitable form and size, now common and well known in association with incubators, brooders and water heaters, may be arranged beneath and discharge heated products of combustion among and against the extension water chambers 22 within the air chamber 10 and through the flues 26 to the atmosphere, said flues serving as draft means for said heater. By this means the water in the extensions and in the water chamber 17 is warmed, thus setting up a circulation of water through said chamber, between said chamber and the extensions, and between the chamber and tank through the pipes 29, 30, to the end of raising the temperature of water in the tank and preventing freezing thereof.

I do not desire to be limited to the exact means shown and described as the same may be modified in many particulars, within the scope of the appended claims without departing from my invention.

I claim as my invention—

1. A water heater comprising an air chamber, a water chamber secured to and at one side of said air chamber and formed with tubular extensions having closed outer ends within said air chamber, said water chamber also being provided with open ended flues communicating with the air chamber, and means of water ingress and egress relative to said water chamber.

2. A water heater comprising an air chamber, a water chamber secured thereto and formed with tubular extensions having closed outer ends within said air chamber and open inner ends communicating with said water chamber, open ended flues mounted through and not communicating with said water chamber and affording communication between the air chamber and the atmosphere exterior of the device, and means of water ingress and egress relative to said water chamber.

3. A water heater comprising an air chamber formed with one end and bottom open, said open bottom being adapted to admit heat from a burner, a water chamber having one end forming a closure for the open end of the air chamber and also formed with hollow extensions arranged horizontally in the air chamber and closed at their outer ends, the inner ends of the extensions communicating with the water chamber, means for discharging heated air from the air chamber, and means of water ingress and egress relative to said water chamber.

4. A water heater comprising an air chamber formed with one end and bottom open, said open bottom being adapted to admit heat from a burner, a water chamber fixed to said air chamber, one wall of said water chamber forming a closure for the open end of the air chamber, said water chamber being formed with hollow extensions within the air chamber, said extensions being integral with said closure wall and communicating through it with the water chamber, means for discharging heated air from the air chamber around and among said extensions, and means of water ingress and egress relative to said water chamber.

5. A water heater comprising an air chamber and a water chamber separately formed and adapted to be connected, there being tubular extensions formed on and communicating with said water chamber and arranged within and throughout said air chamber, means for receiving heated products of combustion within said air chamber among and around said extensions, means for discharging said products of combustion from said air chamber, and means of ingress and egress of water relative to said water chamber.

6. In a water heater, an air chamber formed with an open end and an open bottom, said air chamber being formed with flanges adjacent its open end, a water chamber adjacent to said air chamber, one wall of said water chamber serving as a closure for the open end of the air chamber and bolts extending through said flanges and connected with said water chamber and clamping said chambers together.

7. In a water heater, an air chamber and a water chamber separately formed and arranged in contact, one wall of the water chamber serving as a wall of the air chamber, flanges formed on the walls of said air chamber, an end plate removably mounted on the water chamber, bars extending across said end plate and adapted to be fixed to a support, and bolts connecting said bars and flanges and clamping said chambers together.

8. In a water heater, a water chamber formed with tubular extensions integral with one end wall, a closing plate for the opposite end of said chamber, flues mounted through said end wall and closing plate, and means of water ingress and egress relative to said chamber.

9. In a water heater, a water chamber formed with tubular extensions integral with one end wall, said end wall being formed with tapped holes, a closing plate for the opposite end of the chamber, which closing plate is formed with smooth holes registering with said tapped holes, flues mounted through said smooth holes and screwed into said tapped holes, and means of water ingress and egress relative to said chamber.

10. In a water heater, a water chamber having one end wall formed with tapped holes, a closing plate forming the opposite end wall of said chamber and formed with smooth holes registering with said tapped holes, flues mounted through said smooth holes and screwed into said tapped holes, the outer ends of said flues being formed with integral heads and sealed to said closing plate, and means of water ingress and egress relative to said chamber.

Signed at Webster City, in the county of Hamilton and State of Iowa, this 1st day of July, 1919.

WILLIAM A. McCOLLOUGH.